United States Patent
Su

(10) Patent No.: US 7,493,118 B2
(45) Date of Patent: Feb. 17, 2009

(54) MODE SELECTION METHODS AND RELATED DEVICES IN A MOBILE COMMUNICATION SYSTEM

(75) Inventor: Yu-Li Su, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 523 days.

(21) Appl. No.: 11/320,441

(22) Filed: Dec. 28, 2005

(65) Prior Publication Data
US 2006/0223575 A1 Oct. 5, 2006

Related U.S. Application Data

(60) Provisional application No. 60/656,243, filed on Feb. 25, 2005.

(51) Int. Cl.
*H04Q 7/20* (2006.01)
(52) U.S. Cl. .............. 455/435.1; 455/432.2; 455/421; 455/422.1; 455/414; 370/352; 370/353
(58) Field of Classification Search ........... 455/435.1, 455/432.1, 421, 422.1, 414, 432.2, 407, 408; 370/352, 353, 218
See application file for complete search history.

(56) References Cited

U.S. PATENT DOCUMENTS 5,740,205 A * 4/1998 Baum et al. .............. 375/344
5,946,619 A * 8/1999 Kolev ...................... 455/432.1
6,119,003 A 9/2000 Kukkohovi ................ 455/435
6,961,569 B2 * 11/2005 Raghuram et al. ........ 455/435.1
2004/0022216 A1 2/2004 Shi .......................... 370/335
2004/0224689 A1 * 11/2004 Raghuram et al. ........ 455/435.3

OTHER PUBLICATIONS

"Digital Cellular Telecommunications System (Phase 2+); Functions Related to Mobile Station (MS) in Idle Mode and Group Receive Mode" ETSI TS 100 930 V8.5.0/ Jun. 2001.
"3rd Generation Partnership Project; Technical Specification Group Radio Access Network; User Equipment (UE) Procedures in Idle Mode and Procedures for Cell Reselection in Connected Mode" 3GPP TS 25.304 V3.13.0; Jun. 2003.
"3rd Generation Partnership Project; Technical Specification Group GSM/EDGE Radio Access Network; Radio Subsystem Link Control" 3GPP TS 05.08 V8.18.0; Aug. 2003.
"3rd Generation Partnership Project; Technical Specification Group Core Network; NAS Functions Related to Mobile Station (MS) in Idle Mode" 3GPP TS 23.122 V3.10.0; Sep. 2003.

* cited by examiner

*Primary Examiner*—Minh D Dao
(74) *Attorney, Agent, or Firm*—Thomas, Kayden, Horstemeyer & Risley

(57) ABSTRACT

A mode selection method is utilized in a mobile station. The mobile station can operate in a plurality of supported modes in a mobile communication system. The mobile communication system comprises a plurality of cells. The method comprises: calculating a suggested value of mode selection to match a current environmental state of the mobile communication system; changing a setting of mode selection according to the suggested value of mode selection; camping on a cell according to the setting of mode selection.

20 Claims, 10 Drawing Sheets

| MCC | GSM | WCDMA FDD | WCDMA FDD | CDMA2000 |
|---|---|---|---|---|
| 466 | 1 | 0 | 0 | 1 |

FIG. 5A

| | mode-used information of MCC 466 | | | | mode-used information of MCC 467 | | | |
|---|---|---|---|---|---|---|---|---|
| Byte 233 | 1 | 0 | 0 | 1 | X | X | X | X |

FIG. 5B

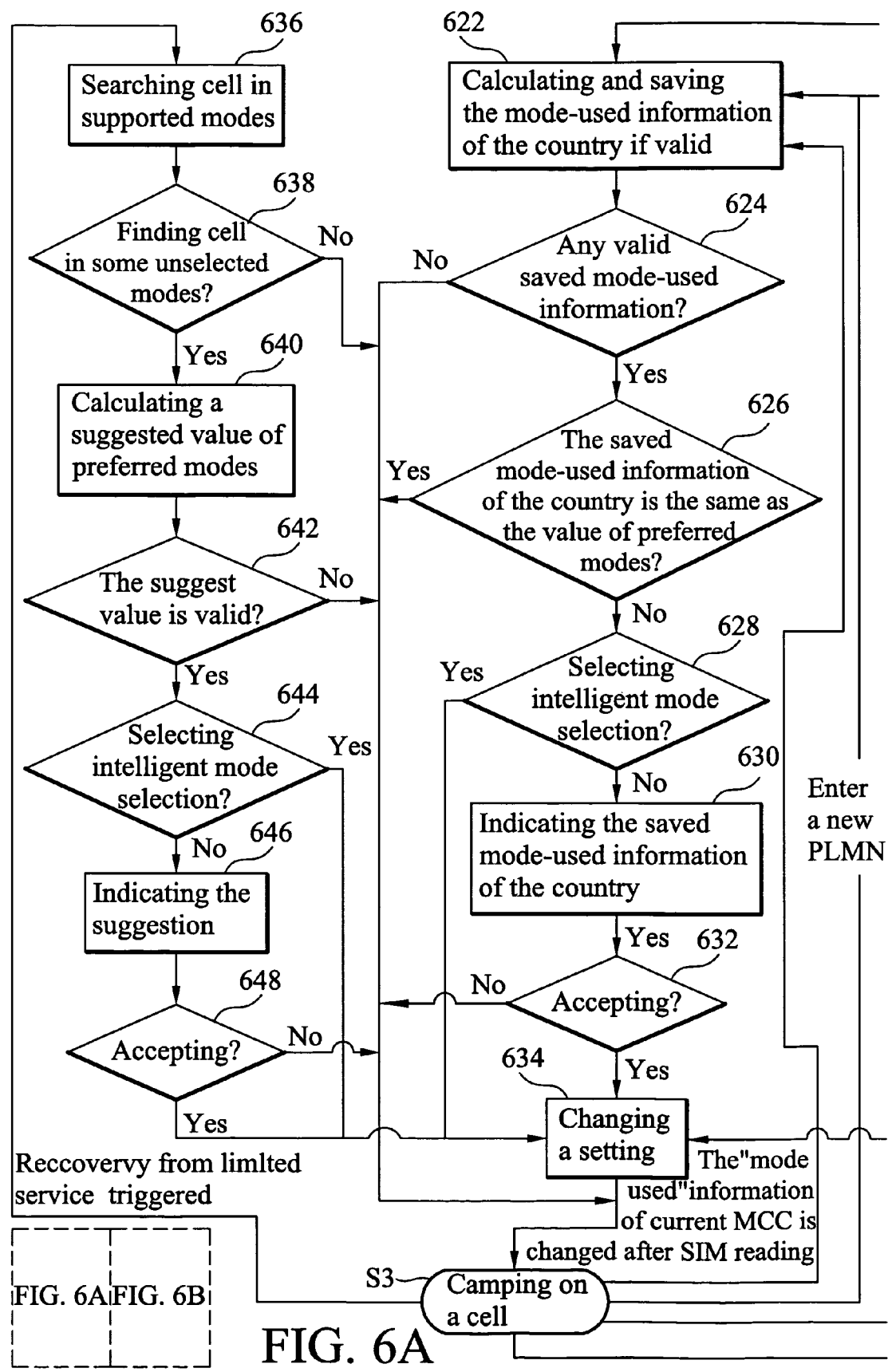

MODE SELECTION METHODS AND RELATED DEVICES IN A MOBILE COMMUNICATION SYSTEM

CROSS REFERENCE TO RELATED APPLICATIONS

This application is related with U.S. patent application Ser. No. 60/656,243, filed Feb. 25, 2005 and entitled "BAND SELECTION IN A MOBILE COMMUNICATION SYSTEM", and U.S. patent application Ser. No. 11/159,849, filed Jun. 23, 2005 and entitled "CARRIER SEARCH METHODS AND RELATED DEVICES".

BACKGROUND OF THE INVENTION

1. Field of the Invention

The present invention relates to mode selection methods, and in particular relates to mode selection methods in a mobile communication system.

2. Description of the Related Art

A multi-mode mobile station (e.g. multi-mode mobile telephone) can operate in all supported modes (radio access technologies, RATs) (e.g. GSM, WCDMA FDD/TDD, CDMA2000). When searching for a network or selecting a cell, the mobile station searches all RF channels within modes of operation (subset of supported modes). This, however, consumes extra power when there are -unused modes in the modes of operation. Additionally, unexpected failure may occur if some useful modes are excluded from modes of operation.

BRIEF SUMMARY OF THE INVENTION

A detailed description is given in the following embodiments with reference to the accompanying drawings.

A mode selection method is utilized in a mobile station. The mobile station can operate in a plurality of supported modes in a mobile communication system. The mobile communication system comprises a plurality of cells. The method comprises: calculating a suggested value of mode selection to match a current environmental state of the mobile communication system; changing a setting of mode selection according to the suggested value of mode selection; and camping on a cell according to the setting of mode selection.

BRIEF DESCRIPTION OF THE DRAWINGS

The present invention can be more fully understood by reading the subsequent detailed description and examples with references made to the accompanying drawings, wherein:

FIG. 5A shows an item format in-the look-up table;

FIG. 5B shows another item format in the look-up table;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Mode selection methods are utilized in the mobile station to dynamically change a setting of mode selection (e.g. preferred modes) in the mobile station to solve the above-mentioned problems. Preferred modes are the modes selected by a user, and modes of operation are the overlapping part of the supported modes and the preferred modes. A detailed description of dynamically changing the setting of preferred modes is provided in the following.

Figure 1:
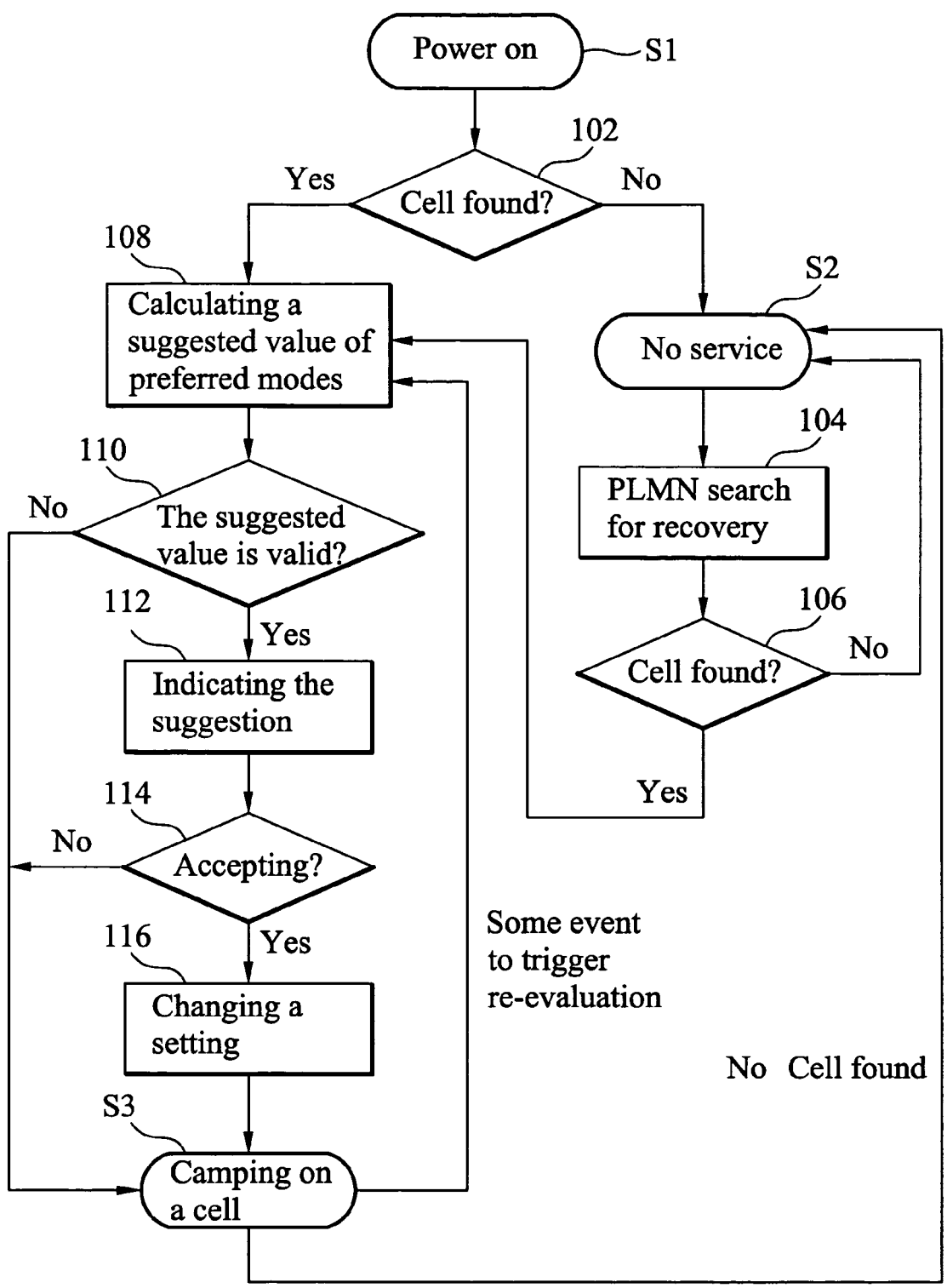
FIG. 1 is a flowchart illustrating a mode selection method according to a first embodiment of the invention.

Please refer to FIG. 1. FIG. 1 is a flowchart illustrating a mode selection method according to a first embodiment of the invention. After power on (state S1), the mobile station either camps on a cell (state S3) or enters a no service state (state S2). If no cell is found (e.g. in a tunnel) after power on (step 102), the mobile station enters the no service state (state S2) and then performs a PLMN (public land mobile network) search for recovery from lack of coverage (step 104). If a cell is found again (e.g. out of the tunnel) after the PLMN search (step 106), the mobile station calculates a suggested value of preferred modes (step 108); otherwise the mobile station stays in the no service state (state S2). A detailed description of calculating the suggested value will be described later. If the suggested value of preferred modes is valid (step 110), a suggestion will appear through a user interface, e.g. man-machine interface (MMI), instructing the user to change the setting of preferred modes (step 112). For example, if the original setting of preferred modes is GSM (The Global System for Mobile Communications) and the found cell is also in the GSM network, but the found cell is in a country utilizing dual mode (e.g. GSM and CDMA200), the suggestion will instruct the user to change the setting of preferred modes from GSM to dual mode. If the user accepts the suggestion (step 114), the mobile station will change the setting of preferred modes (step 116) and then camp on the cell according to the updated setting of preferred modes (state S3); otherwise, the mobile station camps on the cell directly according to the original setting (state S3). Additionally, after camping on a cell (state S3), if the mobile station cannot find the cell again (e.g. when entering a tunnel), the mobile station will enter the no service state (state S2) and repeatedly try to find a cell. If-some event (e.g. entering a new country) is triggered after camping on the cell, the mobile station will re-calculate the suggested value of preferred modes (step 110)

Figure 2:
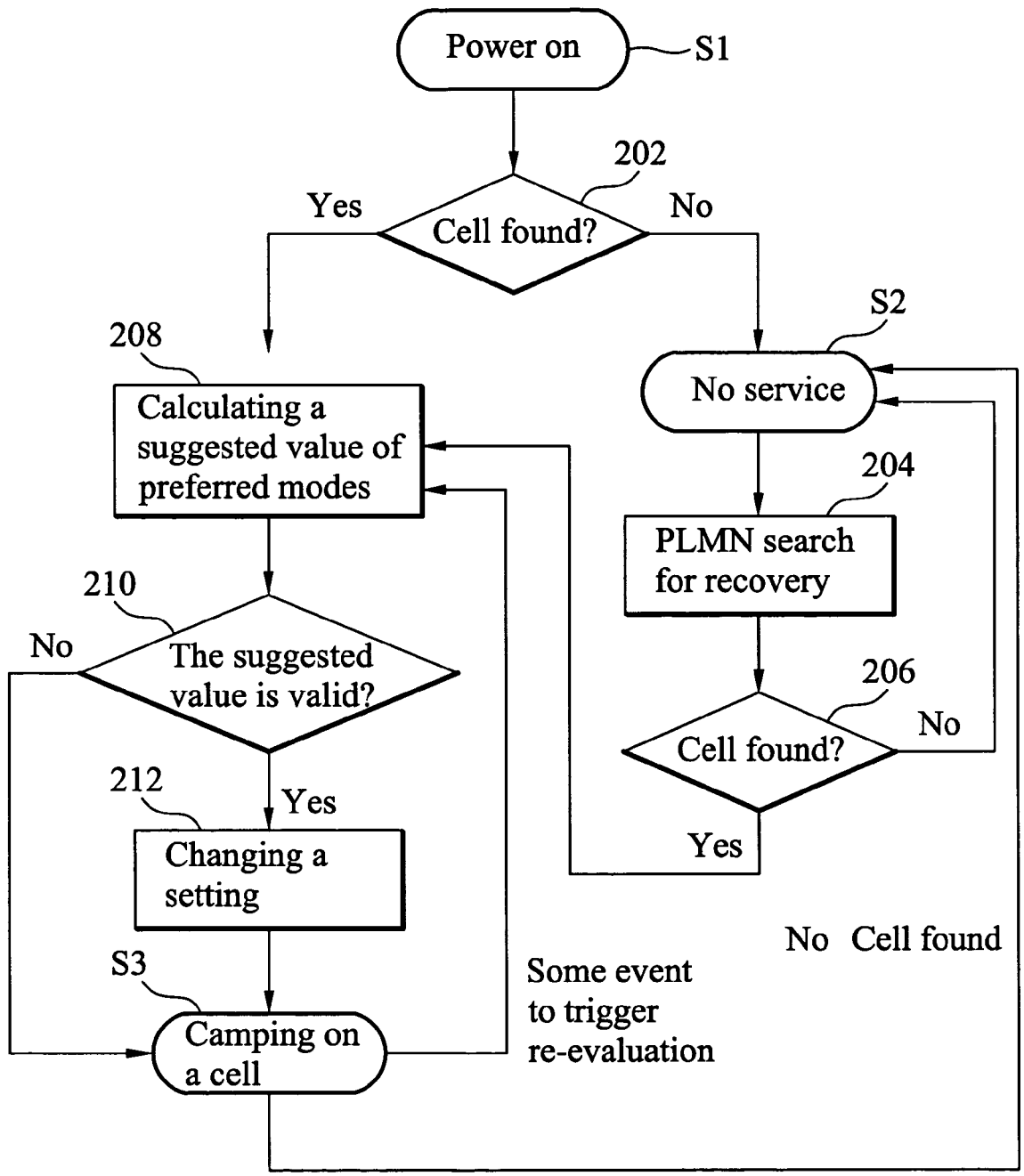
FIG. 2 is a flowchart illustrating a mode selection method according to a second embodiment of the invention.

Please refer to FIG. 2. FIG. 2 is a flowchart illustrating a mode selection method according to a second embodiment of the invention. In the second embodiment, the mode selection method is more intelligent in that it automatically changes the setting of preferred modes rather than asking the user as in the first embodiment. For example, if the original setting of preferred modes is GSM, but the found cell is in a country utilizing dual mode (e.g. GSM and CDMA2000), the mobile station will automatically change the setting of preferred modes from GSM to dual mode (step 212).

Figure 3A:
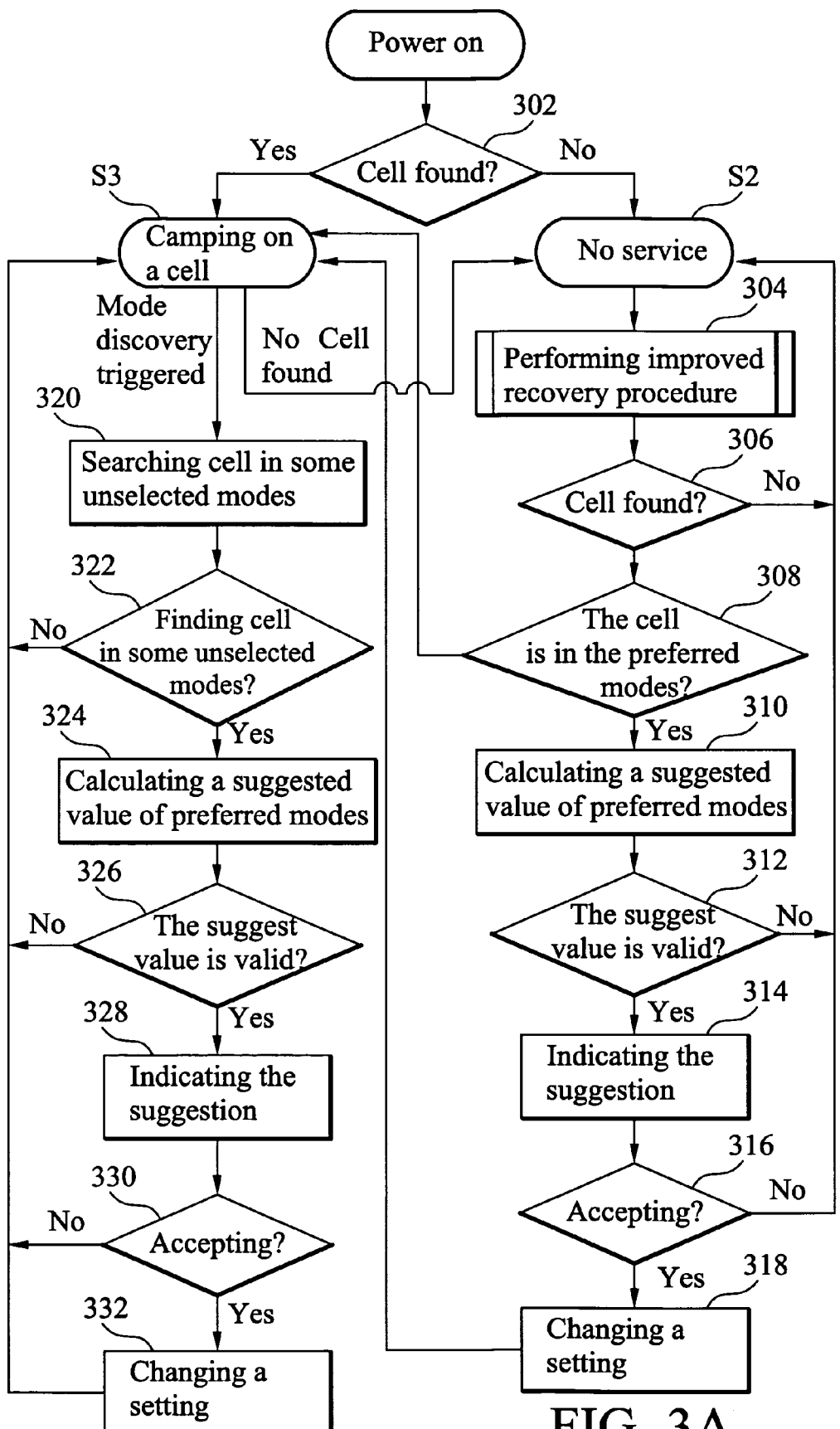
FIG. 3A is a flowchart illustrating a mode selection method according to a third embodiment of the invention.

Please refer to FIG. 3A. FIG. 3A is a flowchart illustrating a mode selection method according to a third embodiment of the invention. After power on (state S1), the mobile station either camps on a cell (state S3) or enters the no service state (state S2). If no cell is found (e.g. in a tunnel) after power on (step 302), the mobile station enters the no service state (state S2) and then performs an improved recovery procedure that is different from the PLMN search for recovery from lack of coverage in the first and second embodiments (step 304). The improved recovery procedure may search all the supported modes. Compared with the PLMN search in the first and second embodiments, the improved recovery procedure in the third embodiment may search for unselected modes, which are not included in the preferred modes, but the PLMN search does not. A detailed description of the improved recovery procedure will be described later (in FIG. 3B). If a cell is found again after the improved recovery procedure (step 306), the mobile station will determine whether the found cell is in the preferred modes (step 308). For example, assume that the original setting of preferred modes is GSM. If the found cell is in WCDMA FDD (found in the improved recovery procedure when searching unselected modes), the method proceeds to step 310 to give a suggested value of preferred modes. If the found cell is in GSM, the mobile station camps on the cell according to the original setting of preferred modes (state S3). In step 310, the mobile station calculates the suggested value of preferred modes. If the suggested value is valid (e.g. the calculated preferred modes are meaningful) (yes in step 312), the method will proceed to step 314; otherwise, the mobile station will return to the no service state again (state S2). For example, assume that the suggested value of preferred modes is valid (yes in step 312) and equal to dual mode GSM and WCDMA (Wideband Code Division Multiple Access) FDD (Frequency Division Duplex), then the corresponding suggestion will be shown in the user interface (step 314). If the user does not accept the suggestion to update the setting of preferred modes (no in step 316), the mobile station will enter the no service state (state S2) since no cell can be found in the original setting of preferred modes (found cell is in WCDMA FDD, but the original setting of preferred modes is GSM). Otherwise, if the user accepts the suggestion (yes in step 316), the setting of preferred modes will be changed to modes GSM and WCDMA FDD (step 318). Additionally, after camping on a cell (state S3), if the mobile station cannot find the cell again (e.g. entering a tunnel), the mobile station will enter the no service state (state S2) and repeatedly try to find a cell. If some events (e.g. mode discovery) are triggered after camping on the cell, the mobile station will re-search some unselected modes (step 320). If a cell can be found after re-search (step 322), the suggested value of preferred modes will be calculated again (step 324). If the new suggested value is valid (yes in step 326), the corresponding suggestion will be shown in the user interface (step 328); otherwise (no in step 326), the mobile station camps on the cell according to the original setting (state S3). In step 330, if the user accepts the new valid suggested value to change the setting of preferred modes, the mobile station camps on the cell according to the updated setting of preferred modes (step 332).

Figure 3B:
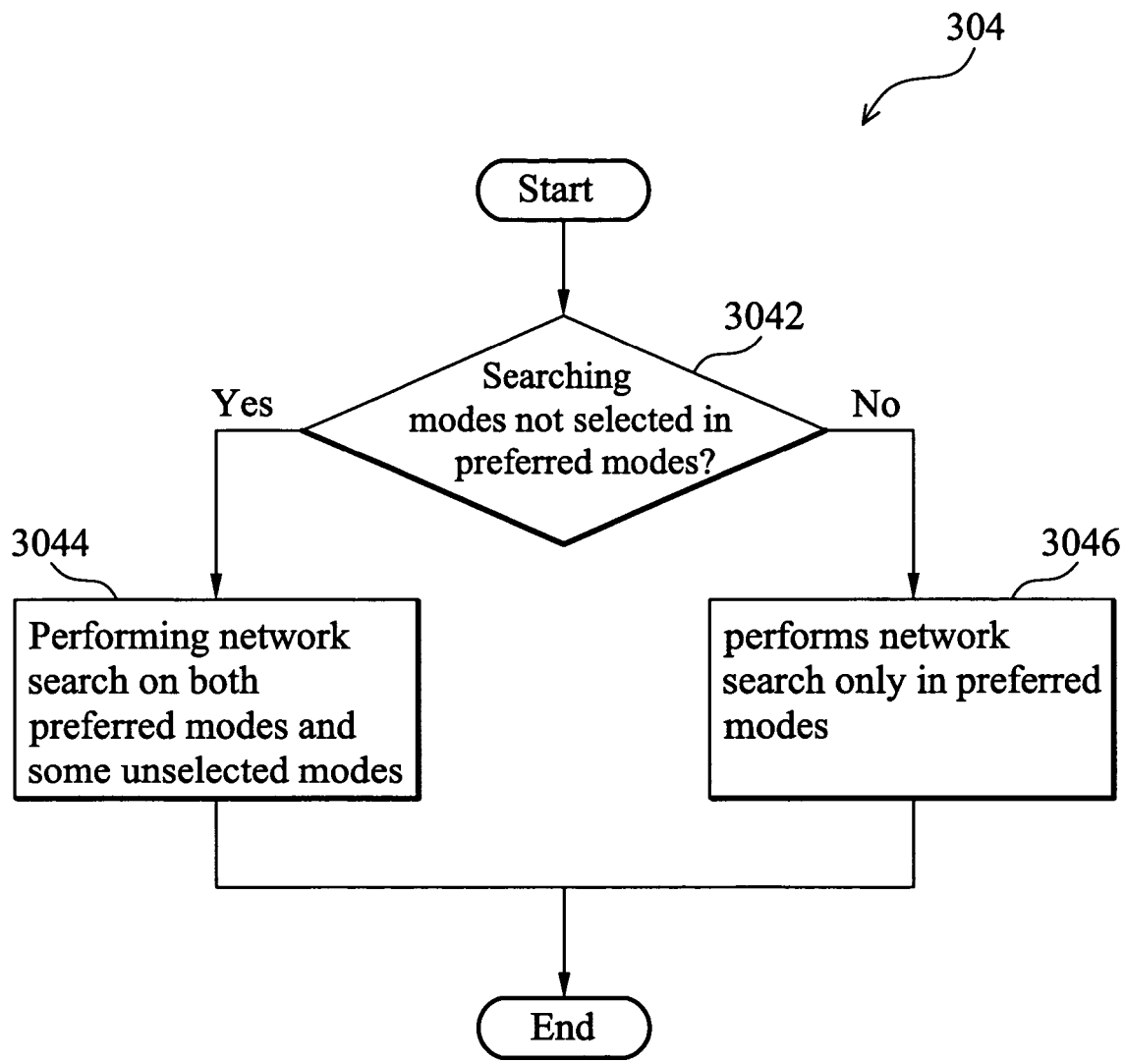
FIG. 3B is a flowchart illustrating the improved recovery procedure in order to find some unselected modes in the preferred modes.

Please refer to FIG. 3B. FIG. 3B is a flowchart illustrating the improved recovery procedure in order to find some unselected modes (unselected in the preferred modes) being utilized in the mobile communication system. The mobile station determines whether it is necessary to search modes not selected in the preferred modes (step 3042). If no, the mobile station performs a network search in preferred modes (the same as the PLMN search for recovery in the first and second embodiments). If yes, the mobile station performs a network search on both preferred modes and some unselected modes (step 3044). For example, the mobile station can utilize a counter to count a predetermined value of times to determine whether it is necessary to search some unselected modes. Assume that the predetermined value of times is equal to three; then the mobile station searches in both the preferred modes and the unselected modes every three times (3, 6, 9, 12 . . . ) and searches in the preferred modes in other times not equal to the multiple of three (1, 2, 4, 5, 7, 8, 10, 11 . . . ). The predetermined value of times can be initially set to a small value to search unselected modes frequently and be increased with time to search unselected modes rarely to save power consumption.

Figure 4A:
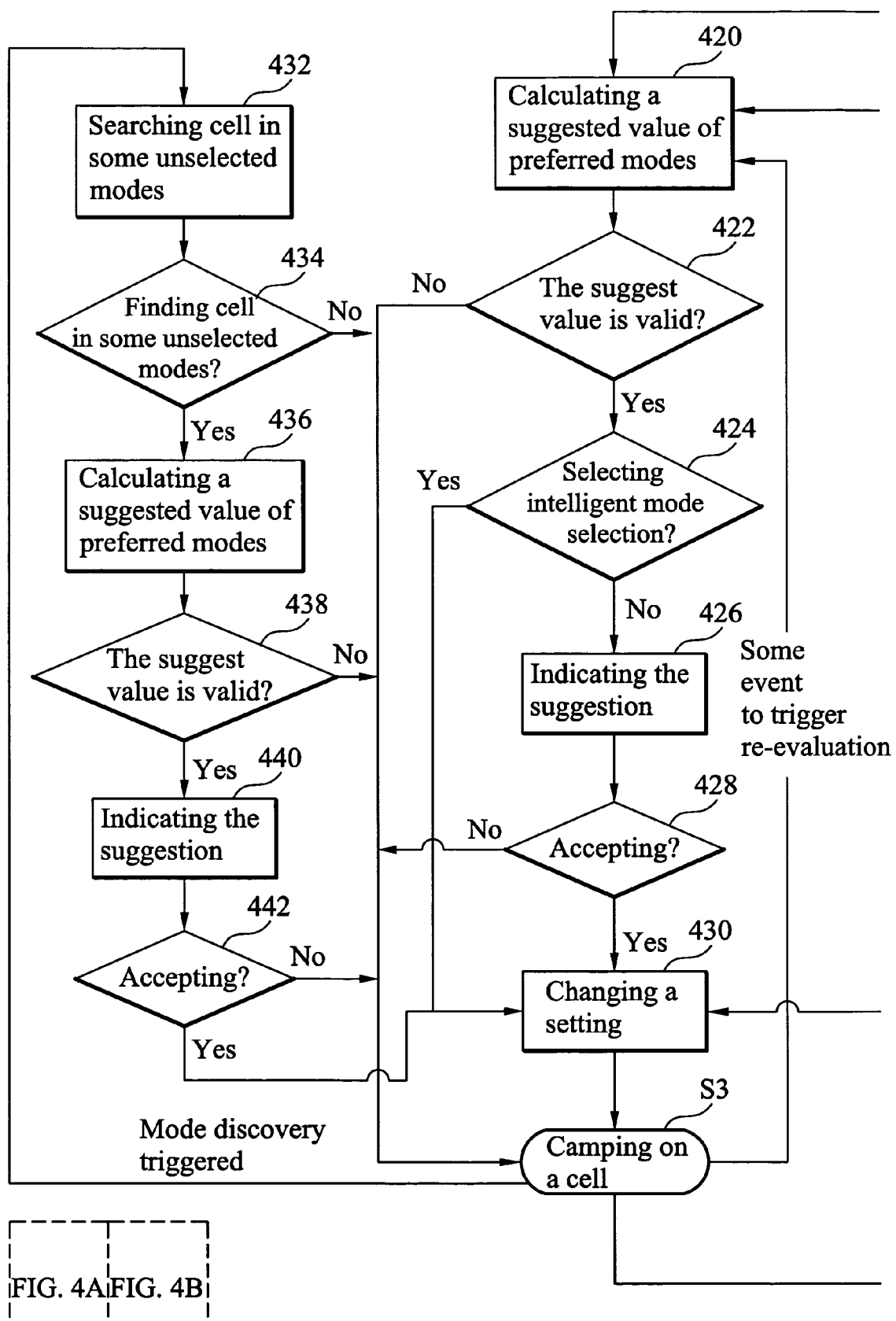
FIG. 4 is a flowchart illustrating a mode selection method according to a fifth embodiment of the invention.
Figure 4B:
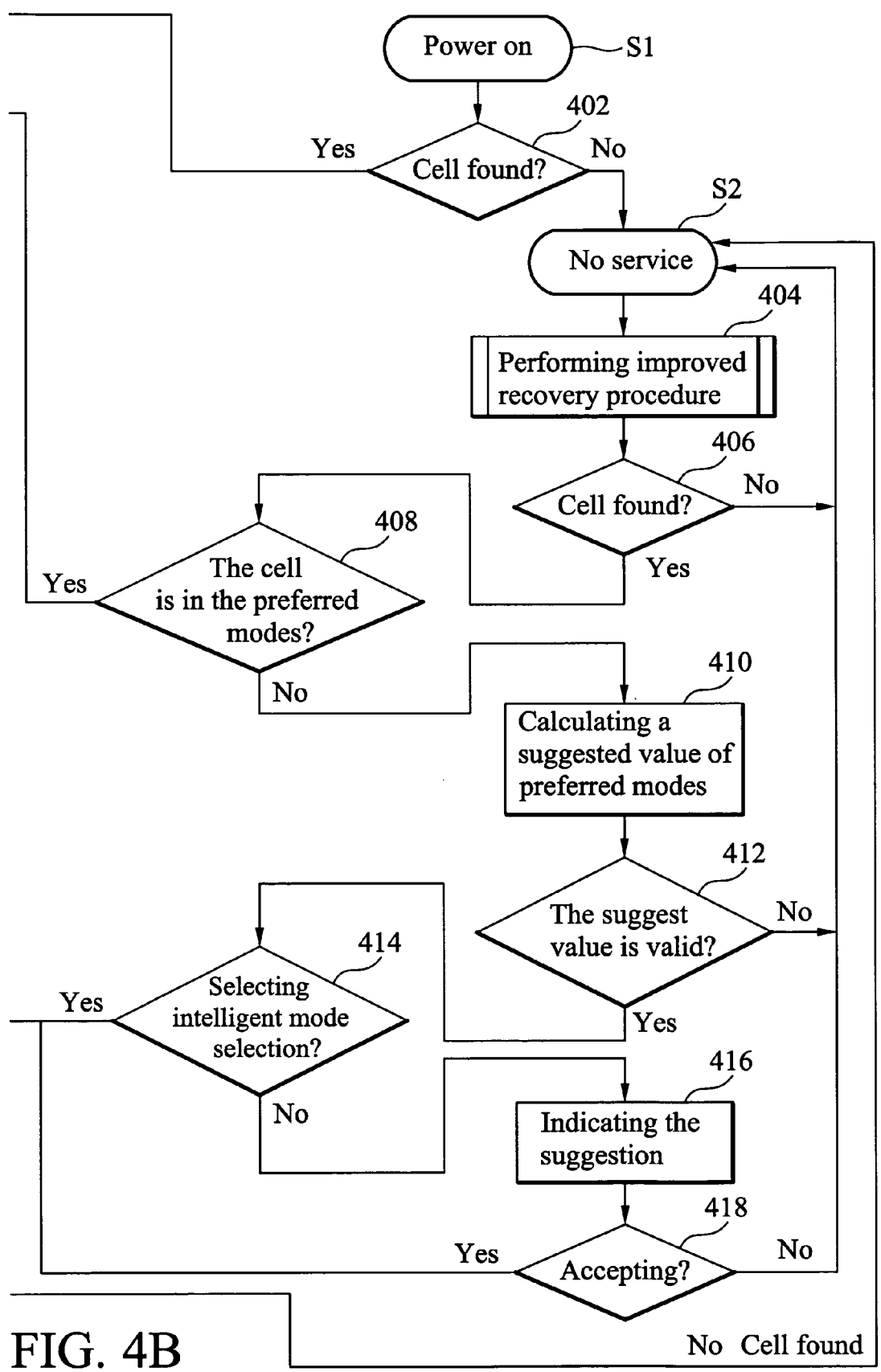

Please refer to FIG. 4. FIG. 4 is a flowchart illustrating a mode selection method according to a fifth embodiment of the invention. After power on (state S1), the mobile station either camps on a cell (state S3) or enters the no service state (state S2). If no cell is found (e.g. in a tunnel) after power on (step 402), the mobile station enters the no service state (state S2) and then performs an improved recovery procedure that is different from the PLMN search for recovery from lack of coverage in the first and second embodiments (step 404). The improved recovery procedure may search all the supported modes. Since the improved recovery procedure has been described in FIG. 3B, further discussion is omitted for brevity. If a cell is found again after the improved recovery procedure (step 406), the mobile station determines whether the found cell is in the preferred modes (step 408). For example, if the original setting of preferred modes is GSM, but the found cell is in WCDMA FDD, it proceeds to step 410 to give a suggested value of preferred modes; otherwise, it proceeds to step 420 to give another suggested value of preferred modes. A detailed description of giving two different suggested values of preferred modes is provided in the following. In step 410, the mobile station calculates the suggested value of preferred modes. If the suggested value is not valid (no in step 412), the mobile station returns to the no service state again (state S2). In the valid condition (yes in step 412), assume that the original setting of preferred modes is GSM, but the found cell is in mode WCDMA FDD. The suggested value of preferred modes may be dual modes GSM and WCDMA FDD after calculation in step 410. If the user does not accept the suggestion to update the setting of preferred modes (step 418), the mobile station enters the no service state (state S2) since no cell can be found in the original setting of preferred modes (found cell is in WCDMA FDD, but the original setting of preferred modes is GSM). On the other hand, in step 420, assume that the original setting of preferred modes is GSM and the found cell is also in GSM network. Although the original setting of preferred modes is good enough to make the mobile station to camp on the cell, the user interface still gives a suggested value of preferred modes to optimize the setting of preferred modes. For example, if the found cell is in a country utilizing dual modes GSM and CDMA2000, the user interface then suggests the user to change the setting of preferred modes from mode GSM to modes GSM and CDMA2000 (step 426). If the user does not accept the suggestion (step 428), the mobile station still can camp on the cell in GSM (state S3), but once the user moves to another cell utilizing CDMA2000 network, the mobile station cannot camp on the cell and enter the no service state (S2) since the setting of preferred modes does not comprise CDMA2000.

Additionally, compared with the first and second embodiments, in the fourth embodiment, an extra option is provided for the user of the mobile station to choose to either manually or automatically change the setting of preferred modes. If an automatic method of changing the setting of preferred modes is chosen in the extra option (Yes in steps 414 and 424), the setting of preferred modes will be changed directly without asking allowance from the user (step 430). Otherwise, if a manual method of changing the setting of preferred modes is chosen (No in steps 414 and 424), a suggestion will be shown on the user interface to request whether to change the setting of preferred modes (steps 416 and 426). Finally, a detailed description of calculating suggested value is provided in the following.

The suggested value may be calculated according to the mode-used information stored in the mobile station. There are various ways to maintain the mode-used information. For example, the mobile station can utilize a look-up table comprising a plurality of items to store the mode-used information. Please refer to FIG. 5A. FIG. 5A shows an item format in the look-up table. In FIG. 5A, each item comprises an MCC (Mobile Country Code) column (3 digits) and a mode-used information column. For example, if the item stores the mode-information of Taiwan, the MCC column will be 466 (Taiwan's country identification code) and the mode-used information column will be 1001 in binary to store information of the usage of dual modes GSM and CDMA2000 in Taiwan (see FIG. 5A). A detailed description of utilizing the look-up table to find the suggested value is provided in the following. After a cell is found, the mobile station can also obtain the country identification code based on system information broadcasted by the found cell, and calculate a suggested value according to a corresponding item (whose value in the MCC column is the same as the country identification code corresponding to the found cell) in the look-up table. For example, if the country code corresponding to the found cell is found to be 466, a suggested value of preferred modes comprising GSM and CDMA2000 is given after searching the look-up table.

Please refer to FIG. 5B. FIG. 5B shows another item format in the look-up table. The look-up table only requires 500 byte bitmap to store 1000 items (3-digits MCCs, 000-999) representing 1000 different countries. Each item comprises only mode-used information item and the MCC value is taken as an index. For example, if the MCC value of Taiwan is 466, the corresponding mode-used information will be stored in the first four bits in the 233rd (233=466/2) byte. Additionally, the last four bits in the $233^{rd}$ byte stores the mode-used information of another country, which's country identification code is equal to 467.

Figure 5C:
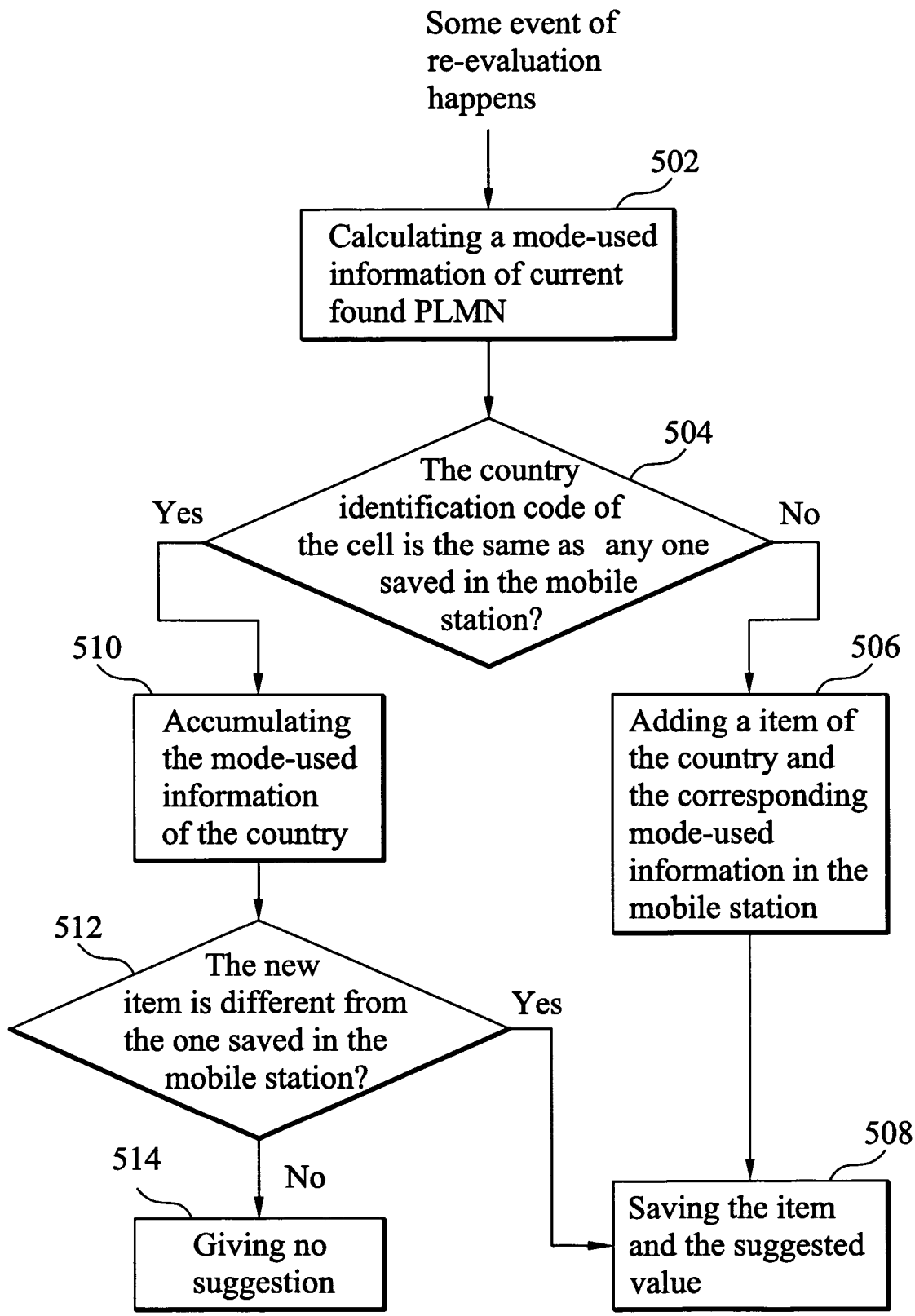
FIG. 5C shows a flowchart illustrating a mode-used information updating method.

Please refer to FIG. 5C. FIG. 5C shows a flowchart illustrating a mode-used information updating method. After a re-evaluation event is triggered, a mode-used information is calculated again (step 502). If the country identification code corresponding to the currently found cell is not stored in any item of the look-up table, the look-up table adds a new item to store the mode-used information corresponding to the country identification code (step 506) and the mobile station gives a new suggested value (step 508). Otherwise, if the country identification code corresponding to the currently found cell exists in a corresponding item of the look-up table, the mobile station determines whether to update the mode-used information in the corresponding item (step 510). If the mode-used information in the corresponding item is updated (step 512), a new suggested value will be given (step 518). Otherwise, no suggested value will be given (step 514). For example, assume that the country identification code corresponding to the currently found cell is equal to 466 (country identification code of Taiwan) and the cell is found in GSM network. If no MCC value in any item of the look-up table is equal to 466, the look-up table then adds a new item storing the mode-used information of mode GSM corresponding to the MCC value of 466 (step 506), and the mobile station will also give a new suggested value of mode GSM (step 508). Otherwise, if the MCC value of 466 exists in an item of the look-up table, the mobile station determines whether to update the mode-used information stored in the item (step 510). For example, if the mode-used information of the item is originally CDMA2000, the look-up table will update the mode-used information from CDMA2000 to both GSM and CDMA 2000 for the item (step 510). If the item is updated, a suggested value will then be given (step 508).

Figure 6B:
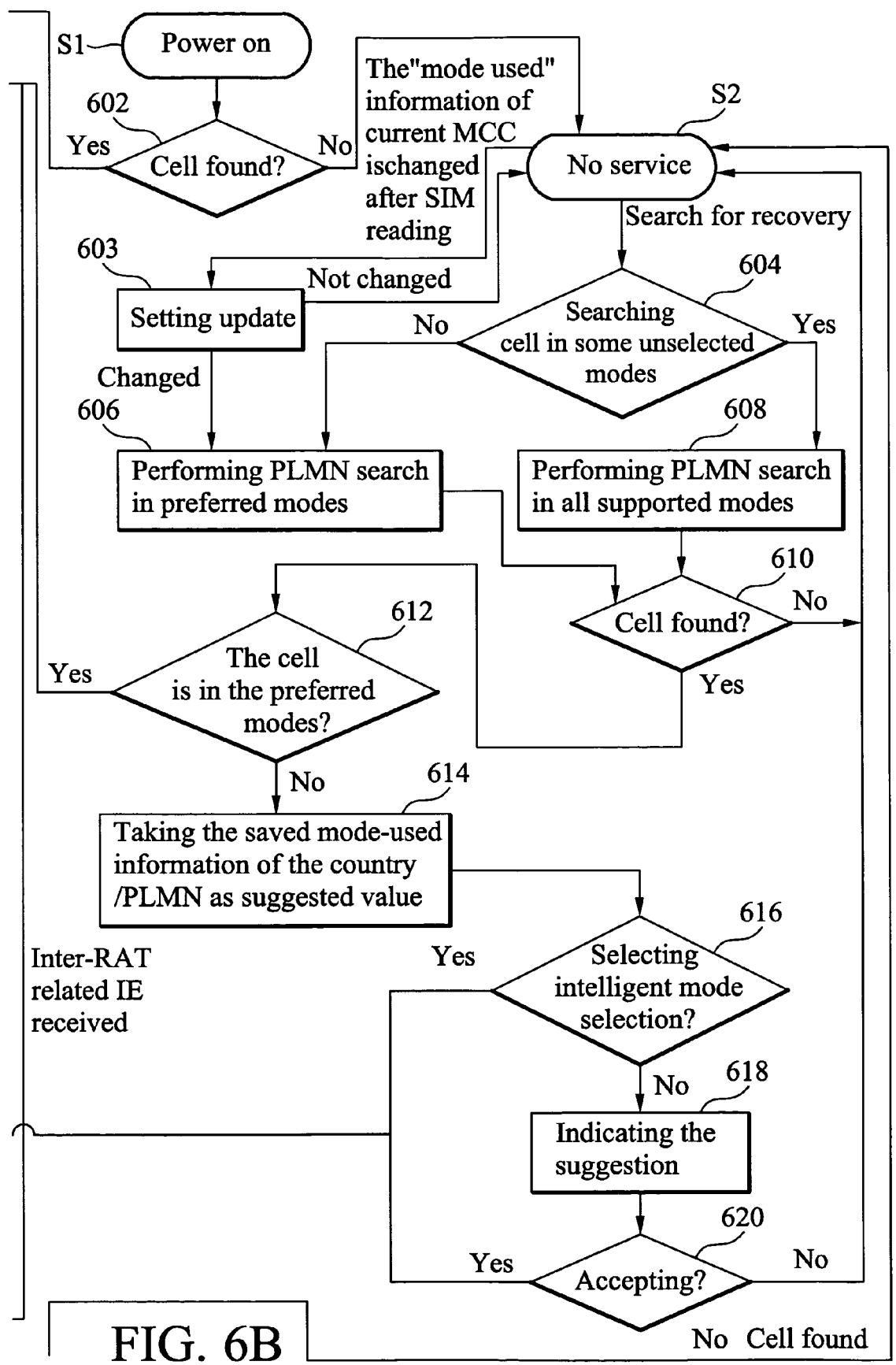
FIG. 6 is a flowchart illustrating a mode selection method according to a fifth embodiment of the invention.

Please refer to FIG. 6. FIG. 6 is a flowchart illustrating a mode selection method according to a fifth embodiment of the invention. Compared with the fourth embodiment, the mode selection method of the fifth embodiment is further described with how to utilize the mode-used information to give the suggested value of preferred modes. Additionally, each previous embodiment can be modified to further describe how to utilize the mode-used information. Here only the fourth embodiment is given as an example.

Compared with the related art, the mode selection method of the invention may consume less power since the network search is performed in optimised preferred modes and unused mode may not be searched. Additionally, unexpected failure may not occur since the setting of preferred modes changes dynamically to fit the current environment. Even if the user initially gives an incorrect setting of preferred modes, the mode selection method can still find an optimised setting of preferred modes again.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mode selection method utilized in a mobile station, said mobile station can operate in a plurality of supported modes, said mobile station is in a mobile communication system, said mobile communication system comprises a plurality of cells, comprising:
   calculating a suggested value of preferred modes to match a current state of the mobile communication system;
   changing a setting of preferred modes according to the suggested value of preferred modes, wherein the preferred modes are modes selected by a user;
   camping on a cell according to the setting of preferred modes;
   performing an recovery procedure to find unselected modes in use of the mobile communication system; and
   adding the unselected modes to the suggested value of preferred modes if the allowance is obtained;
   wherein the unselected modes are modes not in the preferred modes but modes in the supported modes.

2. The method of claim 1, wherein the step of changing the setting of preferred modes further comprises:
   indicating a suggestion to ask allowance from a user; and
   changing the setting of preferred modes if the allowance is granted;
   wherein the suggestion is indicated through a user interface of the mobile station.

3. The method of claim 1, wherein the step of changing the setting of preferred modes further comprises:
   changing the setting of preferred modes automatically without asking any allowance.

4. The method of claim 1, wherein the step of changing the setting of preferred modes further comprises:
providing an option in a user interface of the mobile station to determine whether to ask allowance or not before changing the setting of preferred modes.

5. The method of claim 1, wherein the step of adding the unselected modes further comprises:
indicating a suggestion to ask an allowance from user; and
adding the unselected modes to the suggested value of preferred modes if the allowance is obtained;
wherein the suggestion is indicated through a user interface of the mobile station.

6. The method of claim 1, wherein the step of adding the unselected modes further comprises:
adding the unselected modes automatically without asking any allowance.

7. The method of claim 1, wherein the step of adding the unselected modes further comprises:
providing an option in a user interface of the mobile station to determine whether to ask allowance or not before adding the unselected modes.

8. The method of claim 1, wherein the step of calculating the suggested value further comprises:
calculating the suggested value according to mode-used information of different countries and/or operators.

9. The method of claim 8, wherein a look-up table comprising a plurality of items is utilized to maintain the mode-used information of different countries and/or operators.

10. The method of claim 9, wherein each item of the look-up table comprises an MCC column and a mode-used information column; the MCC column stores information of country identification code, and the mode-used information column stores the mode-used information corresponding to the country identification code.

11. The method of claim 9, wherein each item of the look-up table comprises only a mode-used information column, and the mode-used information column stores the mode-used information corresponding to a country identification code in the order of the value of the country identification code.

12. A mobile station in a mobile communication system, said mobile station operates in a plurality of supported modes, said mobile communication system comprises a plurality of cells, comprising:
means for calculating a suggested value of preferred modes to match a current state of the mobile communication system;
means for changing a setting of preferred modes according to the suggested value of preferred modes, wherein the preferred modes are modes selected by a user;
means for camping on a cell according to the setting of preferred modes;
means for performing an recovery procedure to find unselected modes in use of the mobile communication system; and
means for adding the unselected modes to the suggested value of preferred modes if the allowance is obtained;
wherein the unselected modes are modes not in the preferred modes but modes in the supported modes.

13. The mobile station of claim 12, wherein the means for changing the setting of preferred modes further comprises:
indicating a suggestion to ask allowance from a user; and
changing the setting of preferred modes if the allowance is granted;
wherein the suggestion is indicated through a user interface of the mobile station.

14. The mobile station of claim 12, wherein the means for changing the setting of preferred modes further comprises:
changing the setting of preferred modes automatically without asking any allowance.

15. The mobile station of claim 12, wherein the means for changing the setting of preferred modes further comprises:
providing an option in a user interface of the mobile station to determine whether to ask allowance or not before changing the setting of preferred modes.

16. The mobile station of claim 12, wherein the means for adding the unselected modes further comprises:
indicating a suggestion to ask an allowance from user; and
adding the unselected modes to the suggested value of preferred modes if the allowance is obtained;
wherein the suggestion is indicated through a user interface of the mobile station.

17. The mobile station of claim 12, wherein the means for adding the unselected modes further comprises:
adding the unselected modes automatically without asking any allowance.

18. The mobile station of claim 12, wherein the means for adding the unselected modes further comprises:
providing an option in a user interface of the mobile station to determine whether to ask allowance or not before adding the unselected modes.

19. The mobile station of claim 12, wherein the means for calculating the suggested value further comprises:
calculating the suggested value according to mode-used information of different countries and/or operators.

20. The mobile station of claim 19, wherein a look-up table comprising a plurality of items is utilized to maintain the mode-used information of different countries and/or operators.

* * * * *